United States Patent [19]

Smith

[11] Patent Number: 5,741,872
[45] Date of Patent: Apr. 21, 1998

[54] MULTIFUNCTIONAL POLYACRYLATE-POLYURETHANE OLIGOMER AND METHOD

[75] Inventor: Stuart B. Smith, Conyers, Ga.

[73] Assignee: Hehr International Inc., Decatur, Ga.

[21] Appl. No.: 745,445

[22] Filed: Nov. 12, 1996

Related U.S. Application Data

[63] Continuation-in-part of Ser. No. 629,894, Apr. 10, 1996.
[51] Int. Cl.$^6$ .................... C08F 126/02; C08F 120/36
[52] U.S. Cl. ........................................ 526/301; 526/328
[58] Field of Search ......................... 526/301, 328

[56] References Cited

U.S. PATENT DOCUMENTS 4,590,250   5/1986   Ansel ............................. 526/301

Primary Examiner—Joseph L. Schofer
Assistant Examiner—Wu C. Cheng
Attorney, Agent, or Firm—Richard P. Crowley

[57] ABSTRACT

The invention concerns a multifunctional polyacrylate aliphatic polyurethane oligomer or prepolymer of low molecular weight, a method of preparing such oligomers, and cured polymers and cured laminate-type products employing such oligomers.

21 Claims, 2 Drawing Sheets

MULTIFUNCTIONAL ACRYLATE ALIPHATIC POLYURETHANE OLIGOMER

X = 1, 2 or 3
Y = 1, 2

MULTIFUNCTIONAL POLYACRYLATE-POLYURETHANE OLIGOMER AND METHOD

REFERENCE TO PRIOR APPLICATIONS

This is a continuation-in-part of copending application Ser. No. 08/629,894, filed Apr. 10, 1996.

The parent application discloses a modified acrylic-polyurethane prepolymer composition and an unsaturated polyester resin composition to which the prepolymer has been added. The prepolymer composition includes an acrylic urethane prepolymer prepared by the reaction of diisocyanate, like MDI, with a hydroxyl-containing acrylate monomer, such as a pentaerythritol triacrylate, which prepolymer composition may contain a styrene monomer and an inhibitor, such as benzoquinone, to retard the reaction of the prepolymer and styrene monomer prior to the addition of the prepolymer composition into the polyester resin composition. The employment of the modified urethane prepolymer composition provides for the reduction in the amount of styrene monomer used in the unsaturated resin composition, and also provides for improved chemical and physical properties of the cured, unsaturated resin composition, such as a reduction in glass fiber roll-out when the resin composition is employed with glass fibers.

BACKGROUND OF THE INVENTION

Generally, the process of preparing acrylate-polyurethane oligomers or prepolymers is both time-consuming and temperature sensitive due to the presence of highly reactive acrylic groups in the oligomer or prepolymer. In the parent application, the pentaerythritol triacrylate having an available hydroxyl group is employed, and has been used as a building block with a polyurethane prepolymer to provide a modified polyurethane prepolymer with three pendant acrylate groups. The modified acrylate polyurethane prepolymer so prepared may be employed with monomeric compounds, particularly unsaturated polyester resins, with no or reduced amounts of styrene monomer, and with particulate fillers or fibers, such as glass fibers, to adhere to cured polymers and glass fibers, and particularly polymer laminate-cured products.

However, it is desired to provide for a new and unique, multifunctional polyacrylate polyurethane oligomer having increased and unique structure and multifunctional acrylate functionality, and a low-cost, effective, rapid method to produce such oligomers or prepolymers and resulting cured polymers and laminates based thereon.

SUMMARY OF THE INVENTION

The invention concerns a multifunctional polyacrylate aliphatic polyurethane oligomer or prepolymer of low molecular weight, a method of preparing such oligomers, and cured polymers and cured laminate-type products employing such oligomers.

Multifunctional acrylate aliphatic polyurethane low molecular weight oligomers of the invention are adapted to react with a monomer, such as an unsaturated polyester resin in the presence of a chemical or radiation curing system to provide unique improved cured polymers and cured polymer products. The oligomer of the invention is prepared by reacting, typically in an exothermic reaction, an aliphatic polyisocyanate, more particularly an aliphatic diisocyanate, with an amine polyol, and more particularly a primary amine polyol, to form a polyurethane aliphatic prepolymer having free isocyanate groups. The process includes reacting the aliphatic polyurethane prepolymer with an amine polyacrylate oligomer, such as an amine diadrylate, in amounts sufficient to provide for a polyacrylate polyaliphatic urethane prepolymer having free isocyanate groups. The process includes reacting the resulting polyacrylate aliphatic polyurethane prepolymer with the free isocyanate groups with a polyacrylate aliphatic hydroxyl containing compound, such as and particularly a hydroxyl-acrylate pentaerythritol, for example, a pentaerythritol triacrylate with the prepolymer in a stoichiometric amount sufficient to provide for a multifunctional, aliphatic polyurethane polyacrylate oligomer or low molecular weight polymer, for example, having a weight of less than about 5000, and having substantially no free isocyanate or hydroxyl groups on the oligomer and having a plurality of free polyfunctional acrylic groups adapted to react with other monomer-type compounds to produce cured polymers and cured polymer products.

The oligomer of the invention may be used in the preparation of a cured polymer per se, or cured polymer products, and may be prepared by reacting the multiacrylate multifunctional oligomer with a monomer, such as an ethylenic unsaturated monomer, like, but not limited to, for example, unsaturated polyester-type resins with or without the use of a styrene monomer or other diluent, for example, in amounts of less than about 30 to 40% by weight in the presence of the curing system, such as a chemical curing system, like a peroxide-metal salt curing system or a radiation curing system, such as an ultraviolet photoradiation-type curing system, and optionally with the employment of filler-type material, like chopped glass fibers, or particulates like metal oxides and carbonates, such as titanium dioxide, calcium carbonate and the like, or combinations, to prepare a cured polymer laminate-type product.

The multifunctional polyacrylate aliphatic polyurethane oligomer of the invention presents structurally a dogbone-type oligomer, with a plurality of acrylic groups at each end of the linear polyurethane polymer moiety chain, one end representing acrylic groups derived from the amine polyacrylate, and typically would have one or two acrylic groups, while the other end of the dogbone-type oligomer may contain from one, two or three acrylic groups, depending on the number of acrylic groups in the hydroxy-acrylate compound, like the polyacrylate pentaerythritol employed in the reaction, and with the remaining central part of the dogbone-type polymer comprising an aliphatic polyurethane moiety. The amine with the aliphatic polyurethane moiety is reacted through a nitrogen group of the amine at the other end, the pentaerythritol moiety is connected through an oxygen of the hydroxy group to the aliphatic polyurethane moiety, while the acrylic groups are connected to the remaining part of the pentaerythritol moiety. Thus, the oligomer of the invention provides for rapid, easy and effective production of a unique structural dogbone-type oligomer which may be usefully employed in preparing cured polymers and cured polymeric laminate products.

The oligomer of the invention is prepared in a series of or simultaneous reaction steps, employing an aliphatic polyisocyanate, and typically an aliphatic diisocyanate; that is, with the isocyanate groups connected to an aliphatic group or moiety, particularly an alkyl moiety of the polyisocyanate, which is reacted with an amine polyol, and preferably with a primary amine polyol, in an exothermic-type reaction to form a polyaliphatic urethane prepolymer, the exothermic reaction generally in a temperature range of about 100° to 150° F. An amine polyacrylate, such as an amine diacrylate oligomer, is then added to the reaction mixture at the exothermic temperature range of 100° to 150° F. to provide for the reaction of the amine polyacrylate with the free isocyanate groups of the aliphatic polyurethane prepolymer. The amine polyacrylate oligomer may be employed in varying but sufficient amounts to provide the retention of free isocyanate groups of the resulting polyacrylate aliphatic polyurethane prepolymer.

The monoacrylate aliphatic polyurethane prepolymer with free isocyanate groups is reacted with a polyacrylate hydroxy compound having a free hydroxyl group, such as pentaerythritol, added to the reaction mixture at the exothermic temperature range of 100° to 150° F. The polyacrylate hydroxy compound must have at least one free hydroxyl group, and therefore, for example, the pentaerythritol may comprise a mono-, di-, tri- or polyacrylate pentaerythritol, the preferred embodiment being the triacrylate to introduce the most multifunctional acrylate groups into the other end of the dogbone-type oligomer of the invention. The free hydroxyl groups react with the remaining free isocyanate groups of the mono- or diacrylate aliphatic polyurethane prepolymer at the other end, to provide the multifunctional polyacrylate (5–6 acrylate groups preferred) aliphatic polyurethane oligomer of the invention. This resulting oligomer may be reacted with unsaturated polyester resins with or without the presence of styrene monomer, within a typical cure system with typical fiber or particulate or other filler material, to produce cured polymers or cured laminate polymer products.

The aliphatic polyisocyanates suitable for use in the invention comprise, in one embodiment, aliphatic diisocyanates, which term would encompass the aliphatic, cycloaliphatic, arylaliphatic and heterocyclic aliphatics, having a functionality of about 2.0–4.0 and about 20–34% free isocyanate groups. Aliphatic polyisocyanates usually are extremely slow reacting with polyols. Aliphatic diisocyanates are described in part, for example, in U.S. Pat. No. 4,595,742, hereby incorporated by reference. An acceptable commercial phenyl aliphatic diisocyanate suitable for use in preparing the oligomers of the invention would comprise aliphatic diisocyanate, known as TMXDI (of CYTEC), having the structural formula:

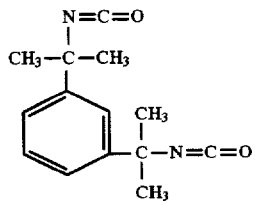

Other acceptable commercial diisocyanates suitable for use include IPDI (HULS) and Desmodur W (Bayer), which aliphatic diisocyanates would have from 30 to 34% free isocyanate groups.

The oligomers are prepared by employing amine polyols, preferably primary amine polyols, to form the aliphatic polyurethane prepolymer. The prepolymer is prepared by employing suitable amounts of the aliphatic diisocyanate and primary amine polyol to provide for residual free isocyanate groups in the prepolymer.

A wide variety of amine polyols may be used to react with the aliphatic polyisocyanates to form the prepolymer, such as for example, amine polyols having an equivalent weight ranging from about 100 to 2500 for example, 200 to 2000. Primary amine polyols are preferred since they provide for fast exothermic reaction, with the temperature ranging from 100° to 150° F., more typically 110° to 135° F., which may provide the basis for the subsequent addition and quick reaction of the amine polyacrylate and the polyacrylate pentaerythritol. Suitable amine polyols, for example, would comprise amines having from about 10 to 50 $C_2$–$C_4$ alkylene-oxy groups, like ethyoxy propoxy groups, for example, 30 to 40 alkoxy groups with one or more primary amine groups.

Commercial products suitable for use as the amine polyol in forming the oligomer of the invention would include, for example, but not be limited to: D-2000 Jeffamine of Huntsman Chemical, equivalent weight 1000, having the structural formula:

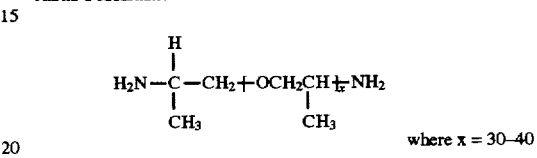

where x = 30–40 or, for example, 7059 polyaspartic amine polyol of Bayer, equivalent weight 233. The polyaspartic or other amino acid polyols suitable for use would include polyaspartic amine polyol esters having, for example, the following structural formula:

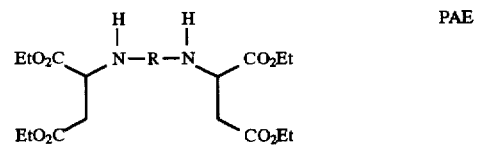

wherein the R may be any linking group as follows:

| PAE | R | EW | Viscosity* | Gel Time** |
|---|---|---|---|---|
| A | ⌬–$CH_2$–⌬ | 277 | 1000 | 2–3 h |
| B | ⌬($CH_3$)–$CH_2$–⌬($CH_3$) | 291 | 1500 | >24 h |
| C | –$(CH_2)_6$– | 229 | 150 | <5 min |
| D | ⌬ with $H_3C$, $H_3C$, $CH_3$ | 256 | 800 | 2–3 h |

*100% Solids, mPa · s at 23° C.
**HDI Polyisocyanurate/PAE, NCO/NH: 1.0, 65% solids in 1:1 MEK/ Aromatic 100

The cited aliphatic diisocyanates and amine polyols described herein are well known commercial compounds, as are the resulting aliphatic polyurethanes with free isocyanate groups produced thereby. The aliphatic diisocyanate is typically reacted with the amine polyol, for example, at a ratio of about 1:1 in a closed vessel with agitation. While agitating the aliphatic diisocyanate, the amine polyol is added to provide for immediate exothermic reaction, raising the temperature generally from room temperature of 60° to 75° F. to 120° to 140° F. in a few minutes, for example, two to fifteen minutes, resulting in a clear aliphatic polyurethane prepolymer with a low viscosity, typically less than 5000 cp and for example, 500–2000 cp.

The oligomer of the invention is prepared by employing an amine polyacrylate, particularly an amine diacrylate, such as an amine diacrylate oligomer. Suitable commercial products are known by the commercial name EBECRYL® 7100 of UCB Chemical Corporation, Atlanta, Ga. Another suitable commercial product is Sartomer 384 of Sartomer Chemical Co. Such amine polyacrylate oligomers are acrylate functional oligomer amine resins, which are generally used as an additive or diluent for more viscous oligomers, and are used in formulations with photoabstraction-type photoinitiators, such as benzophenone, which provides for accelerating effects on UV cure to promote adhesion to plastic substrates, and generally have a molecular weight of about 800, from about the density of 9.2 and a viscosity at 25° C., ranging about 800 to 1400 cp.

The amine polyacrylate oligomer may be an amine diacrylate oligomer to provide two additional acrylate groups to one end of the resulting oligomer, and is added directly to the exothermic reaction mixture in an amount, for example, of about half by weight of the prepolymer level, after the reactions to prepare the prepolymer, so as to provide for the polyacrylate groups to be attached to the aliphatic polyurethane prepolymer, while still leaving some free isocyanate groups on the aliphatic polyurethane prepolymer, which are available to react with the pentaerythritol polyacrylate.

The oligomer of the invention is produced by the addition of the polyacrylate pentaerythritol monomer compound, usually added directly to the exothermic reaction mixture with continued agitation. Generally, the amount of the polyacrylate pentaerythritol, i.e. a pentaerythritol triacrylate (PETA) is selected to react with the remaining free isocyanate groups of the polyacrylate mono- or diacrylate aliphatic polyurethane prepolymer, so as to provide for the resulting oligomer with substantially no free isocyanate groups, for example, less than 0.5%, to provide an oligomer with multifunctional acrylate groups at each end of the oligomer. Thus, the pentaerythritol polyacrylate or any hydroxyl-containing compound, such as an acrylate monomer, may be used, but particularly preferred is PETA pentaacrylate. The reaction with the free isocyanate groups of the prepolymer, with the high functionality hydroxyl acrylate monomers, includes ethoxylated or propoxylated trimethylolpropane or glycerol polyacrylates, with various ethoxylated pentaerythritol polyacrylates and various combinations thereof, to provide for a plurality of acrylate groups at one end of the oligomer and yet to provide a free hydroxyl group for reaction with the free isocyanate groups of the prepolymer.

Thus, to prepare the oligomer, the triacrylate pentaerythritol and the amine diacrylate polyols are the preferred compounds. In the preferred reaction sequence, the amine polyacrylate monomer or oligomer is added directly to the prepolymer composition immediately after the exothermic reaction of the aliphatic diisocyanate, while still at a temperature of 100° F., and the polyacrylate PETA is then added to the reaction mixture. The method for preparing the resulting oligomer provides for a very fast, low cost reaction and eliminates the use of pressure reactors, very high temperatures and very high viscosity of the products, and provides a short reaction time to produce the desired oligomer. The conventional aliphatic polyurethane production normally takes four hours or more to produce, with a viscosity of near $10^6$ cp. Therefore, usually low viscosity monomers should be added to maintain a pourable liquid prepolymer, such as, for example, the diacrylate oligomer of the invention made with the aliphatic isocyanate and the amine polyol with the use of the polyacrylate PETA to provide for a dogbone-type shape, uniquely structured, multifunctional acrylate aliphatic polyurethane polymer, low molecular weight polymer or oligomer.

The method of preparing the multifunctional acrylate polyurethane oligomer requires first the preparation of the polyurethane prepolymer; however, the reacting of the amine polyacrylate and the hydroxy-containing polyacrylate compound with the free isocyanate groups may be carried out simultaneously or sequentially in any order.

The low molecular weight oligomer may be added to unsaturated polyester resin compositions, either alone or preferably in the concentrated form, with some styrene monomer for viscosity control purposes. The total amount of the styrene monomer in the unsaturated resin composition may vary, but typically is less than 50% and more often less than 30% by weight. The saturated resin-type composition contains an inhibiting agent to provide storage stability, and an inhibitor which generally comprises a quinone compound, such as a parabenzoquinone. The oligomer may be employed as a monomeric additive and/or diluent to the saturated polyester resin composition. Such polyester resins are prepared by reacting a dicyclopentadiene with orthophthalic and maleic acid. The reaction of polypropylene glycol with maleic acid anhydride with neopentaglycol or other glycols provides generally known commercial unsaturated polyester resin compositions. The unsaturated polyester resin composition generally contains a monomer for crosslinking therewith, such as a styrene monomer. The oligomer-unsaturated polyester resin composition produces a cured polymer with curing generally carried out by employing a curing system, wherein the cure is affected by an organic peroxide compound, with usually a metal salt promoter, such as a metal fatty acid salt, such as cobalt octoate or potassium octoate, and also an organic ketone, such as methyl ethyl ketone or peroxide. Generally peroxide, metal salts, amines, amides and various other additives are employed at low levels generally ranging from about 0.1 to 2.5% by weight, metal salts ranging from 0.05 to 0.5% by weight, in addition amines or amides from about 0.5 to 0.5% by weight.

Photoinitiators may be added, so as to provide for photoinitiated radiation-type cures. Various photoinitiator levels usually range from 0.01 to 1.0%, for example, directly to the unsaturated resin of the oligomer, and the oligomer is added thereafter, then the composition is exposed to sunlight, UV light, or high energy radiation to effect a similar cure. Both chemical and photocure may be used alone or in combination as desired. Typical photoinitiators may vary, however, acceptable commercial photoinitiators useful with the oligomers of the invention with unsaturated polyester resin compositions would comprise Photoiniators 1173 and 4265 by CIBA. The photoinitiator compositions or combinations thereof may be used or directly involved in the production of initiator radicals for polymerization through the employment of UV light. A wide variety of photoinitiators include benzildimethyl ketal, a mixture of benzoin, normal butyl ethers, trimethylbenzophenone, alpha hydroxy ketones, and isopropylthioxanthone, and ethyl-4benzoate.

The cured polymers created by the use of the oligomers of the invention together with the monomeric compound may include various fillers, additives, including silicon and carbon, and elastomers, diluents, cross-linking agents, polymer modifiers, viscosity control agents, dyes, pigments, fillers, refractives, antioxidants, stabilizers, absorbers, lubricants, flame retardants, scorch retardants, other monomers, oligomers and polymers as required. They also include use of particulate material, such as fibers, more particularly in the employment of chopped glass fibers, such as 20 to 60% by weight to provide for glass fiber laminates, which contain particulate polyunsaturates for the employment of various metal oxides, such as titanium or barium oxides or other metal or carbonate or oxides for strengthening fillers for aesthetic purposes, or any combination thereof. Curable polymer compositions may be prepared by casting, coating, molding, spraying or any other combination.

The curable polymer compositions prepared employing the oligomer may be used to prepare a wide variety of cured polymers or cured polymer products, to include paints, coatings, adhesives, and sealants, but particularly are employed for the making of glass fiber laminates, wherein the curable polymer composition is sprayed in the presence of a filler or fibers, or both, onto a substrate or into a mold to provide a resulting cured laminate product.

The invention will be described for the purposes of illustration only in connection with certain embodiments; however, it is recognized that various modifications, changes, additions and improvements may be made to the illustrated embodiments without departing from the spirit and scope of the invention.

DESCRIPTION OF THE EMBODIMENTS

Figure 1:
FIG. 1 is a schematic illustration of the multifunctional acrylate aliphatic polyurethane oligomer of the invention.

FIG. 1 is a schematic representation of the generic formula of the oligomer of the invention showing the polyurethane moiety with acrylic groups at each end of the oligomer with the acrylic group ($CH_3$—COO—) at one end attached to the polyurethane moiety through the nitrogen of the amine polyacrylate and the acrylic group at the other end attached through an oxygen derived from the hydroxy-acrylate compound.

Figure 2:
FIG. 2 is a schematic illustration of one embodiment of preparing the oligomer of FIG. 1.

FIG. 2 is a more specific representation of the preferred oligomer of FIG. 1 wherein the amine diacrylate and the triacrylate pentaerythritol are used to prepare the oligomer.

Figure 3:
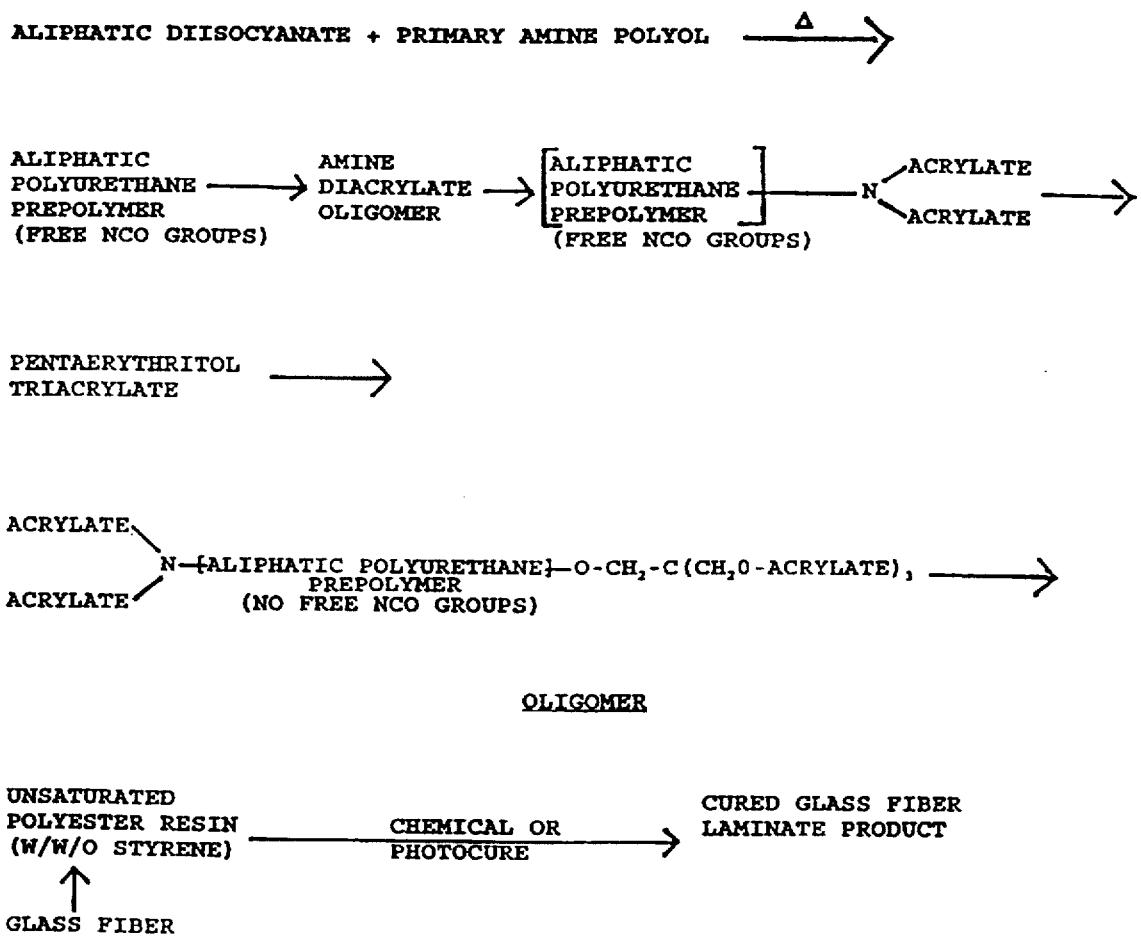
FIG. 3 is a schematic block flow diagram of the reaction steps to prepare the oligomer of FIG. 2 and also in the preparation of a cured polymer or laminate product.

FIG. 3 is a schematic block flow diagram of one embodiment of preparing the oligomer of FIG. 2 and the use of the oligomer with an unsaturated resin to prepare a cured glass fiber laminate product.

Multifunctional acrylic aliphatic polyurethane oligomers of the invention were prepared employing the following commercial products:

Aliphatic isocyanate
TMXDI (CYTEC) 34% NCO
IPDI (HULS) 34% NCO
Desmodur W (Bayer) 32% NCO
Primary amine polyols
D-2000 Jeffamine (Huntsman Chemical Co.)
7059 polyaspartic (Bayer) eq. wt. 233
Acrylic monomer
pentaerythritol triacrylate
Amine polyols
amine diacrylate oligomer
Ebecryl® 7100 (UCB)
Sartomer 384 (Sartomer Chemical Co.)

EXAMPLE 1

TMXDI was reacted with D-2000 at a wt. ratio of 1:1 by adding TMXDI to a closed reaction vessel with agitation. While agitating the TMXDI, equal amounts by weight of D-2000 were added to provide for an exothermic reaction, increasing the temperature from 75° F. to 130° F. in 5 minutes, resulting in a clear polymer with a viscosity of 1000 cp. The amine diacrylate oligomer was then added to the reaction, a mixture at about half of the aliphatic polyurethane prepolymer level, in a reaction that is still hot to provide for the attachment of the diacrylate groups attached to the aliphatic polyurethane prepolymer, while still leaving some free isocyanate groups available to react. While the reaction mixture was still at temperature, the PETA triacrylate was added, with continued agitation for about fifteen minutes. The amount of the PETA was added to provide for a resulting reactive oligomer having substantially no free isocyanate groups, and no available hydroxyl groups on the pentaerythritol having available multifunctional polyacrylates (between 5–6 acrylate groups).

EXAMPLE 2

Other tests were carried out substituting IPDI or Desmodur W for TMXDI, however no differences were seen. However, in order to increase the stiffness of the resulting oligomer and to incorporate polyester linkages into the multifunctional active oligomer produced by the invention, primary amine polyol was changed to a polyaspartic polyol 7059 being substituted for the D-2000, with processing being the same with a very fast polymerization and low viscosity product resulting.

EXAMPLE 3

The oligomers made with the TMXDI D-2000 and PETA were added at 12.5% to an NPG based unsaturated polyester resin with a styrene monomer level of about 30%. No promoters, such as cobalt octoate 12% or Dimethyl Aceto Acetamide (DMAA), were added. However, two photoinitiators were added to the system:

1173 CIBA at 0.5% by wt.
4265 CIBA at 0.25% by wt.

The resulting oligomeric mixture of the oligomer and the unsaturated polyester resin styrene and photoinitiators, was added to about 50% chopped strand mat fiberglass, mixed and then exposed to 160-watt high intensity mercury vapor bulb, with exposure times of 5, 10 and 15 minutes at about 16" height. After five minutes, the surface of the glass containing polymer was tack free and showed a barcol hardness of about 30, however, the surface at the bottom of the laminate was not cured, the thickness of the laminate being about ¼". At ten minutes exposure, the barcol reading was 40 at the top and 10 at the bottom of the laminate, while at 15 minutes, the barcol hardness level was 40 on both the front surface and bottom of the respective laminate, indicating a full cure and high hardness. Barcol measurement is a measurement of hardness, with a 10 barcol representing about an 85 shore D hardness, the barcol for the cured laminate ranging from about 30–60.

EXAMPLE 4

The same photoinitiator levels of 0.5% and 0.25% respectively were added to the unsaturated polyester resin alone without the use of the additive oligomer of the invention. UV exposures were then run at the same time limit and conditions, and the laminate measured and found that no barcol readings were seen at 5 or 10 minutes or at 15 minutes. A barcol reading of 10 was obtained at the surface but no cure was found at all at the bottom of the laminate.

EXAMPLE 5

Styrene monomers were nonexistent in the samples in which the oligomer was added, however, were still present in samples without the oligomer. Two standard oligomers from Sartomer Co. were tried in place of the oligomer of the invention. No cure was obtained at the bottom of the laminate and a 10 barcol in 15 minutes was obtained with a surface tackiness resulting that was not in the new oligomer.

EXAMPLE 6

The second oligomer which contained the amine diacrylate in the prepolymer was tried at 12.5% in the NPG resin with the same photoinitiators at 0.5 and 0.25%. A 50% glass laminate was made and exposed to the mercury vapor bulb at 5, 10 and 15 minute exposure times at 16" height. The 5 minute sample had a barcol hardness reading at the top and bottom of the laminate with no styrene monomer present. Time was reduced to 3 minutes with a 30 barcol reading on both sides. A 45 barcol was obtained at 3.5 minutes. The example shows that the addition of more free radicals increased cure times. No surface tack was present.

No differences were observed using IPDI or Desmodur W. The oligomers made using the polyaspartic polyol instead of D-2000 gave faster cure at the surface, but less cure at the bottom surface of the laminate. The addition of the amine diacrylate did not change the cure.

EXAMPLE 7

The same oligomers were added to the NPG polyesters as before, but this time 0.1 cobalt octoate 12% and 0.2% DMAA were added. The material was catalyzed with 2% MEKP (methyl ethyl ketone peroxide at 9% oxygen) and mixed with 50% chopped glass. The system was cured in 15 minutes. Barcol reading developed in 22 minutes. Styrene monomer smells were slight. The same polyester without the oligomer was used. Cure time was 26 minutes with barcol reading of 40 minutes. Styrene monomer smell was still strong. The second oligomer with the polyaspartic as the amine polyol was used at 12.5%. Cure time was 10 minutes with a barcol reading of 45 in 18 minutes. A slight styrene monomer smell was present. No difference was seen using IPDI or Desmodur W.

The new polycarbite aliphatic polyurethane oligomers of the invention can be used with unsaturated polyester resins to produce very fast cured laminates without a styrene monomer being present. Physical testing shows better properties when a higher degree of polymerization can be obtained. It is also apparent that the new oligomers cure in air without inhibition at the surface that acrylic monomers and oligomers do normally do with or without peroxide curing or light curing.

What is claimed is:

1. A method of preparing a multifunctional polyacrylate aliphatic polyurethane oligomer adapted to react with a monomer in a polymer curing system, which method comprises:

a) reacting an aliphatic polyisocyanate with an amine polyol to form a polyurethane prepolymer with free isocyanate groups;

b) reacting the aliphatic polyurethane prepolymer with an amine polyacrylate monomer in an amount sufficient to provide an acrylate-aliphatic polyurethane prepolymer with free isocyanate groups; and c) reacting a polyacrylate aliphatic hydroxy monomer with the acrylate-aliphatic polyurethane prepolymer in about a stoichiometric amount to react the hydroxy group with the free isocyanate groups to provide a multifunctional polyacrylate aliphatic polyurethane oligomer having substantially no free reactive isocyanate or hydroxyl groups.

2. The method of claim 1 wherein the aliphatic polyisocyanate comprises an aliphatic diisocyanate having from about 20% to 34% free isocyanate groups.

3. The method of claim 1 wherein the amine polyol comprises a primary amine alkoxypolyol.

4. The method of claim 1 wherein the amine polyacrylate monomer comprises an amine diacrylate monomer or oligomer.

5. The method of claim 1 wherein the amine polyol has an equivalent weight of about 100 to 3000.

6. The method of claim 1 wherein the amine polyol amine comprises a polyaspartic polyol or a poly aspartic acrylate ester polyol.

7. The method of claim 1 which includes carrying out the reacting steps b) and c) at a temperature of about 100° F. to about 150° F.

8. The method of claim 1 wherein the polyacrylate aliphatic hydroxy monomer comprises an aliphatic hydroxy $C_2$–$C_6$ polyacrylate monomer.

9. The method of claim 1 wherein the polyacrylate aliphatic hydroxy monomer comprises a pentaerythritol polyacrylate.

10. The method of claim 9 wherein the pentaerythritol polyacrylate comprises pentaerythritol triacrylate.

11. The multifunctional polyacrylate aliphatic polyurethane oligomer produced by the method of claim 1.

12. The method of claim 1 wherein the said oligomer has a general dog bone structure characterized by a plurality of acrylate groups at each end of the structure, one end having O—C acrylate groups and the other end N-acrylate groups.

13. The method of claim 12 wherein said oligomer has an aliphatic polyurethane moiety and two acrylate groups at one end and one, two or three acrylate groups at the other end of the structure.

14. The method of claim 1 wherein the aliphatic polyurethane prepolymer is a clear prepolymer with a viscosity of about 500–2000 cp.

15. The method of claim 1 wherein said oligomer has the general structural formula:

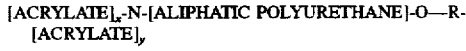

and wherein X is a whole number of 1 or 2, Y is a whole number 1, 2, or 3, and R is a divident aliphatic linking group.

16. The method of claim 1 wherein said oligomer has the structural formula:

17. The method of claim 1 wherein the amine polyol comprises a primary amine polyol.

18. The method of claim 1 wherein the amine polyol comprises a primary amine polyol having about 10 to 50 ethoxy or propoxy groups and with one or more primary amine groups.

19. The method of claim 1 wherein the polyacrylate aliphatic hydroxy monomer comprises an etheroxylated or propoxylated trimethyol propane or glycerol polyacrylate.

20. A method of preparing a multifunctional polyacrylate aliphatic polyurethane oligomer adapted to react with a monomer in a polymer curing system, which method comprises:

a) reacting an aliphatic polyisocyanate having from about 20 to 34 percent free isocyanate groups with a primary amine polyol having an equivalent weight of about 100 to 3000 to form a polyurethane prepolymer with free isocyanate groups;

b) reacting with the aliphatic polyurethane prepolymer an amine diacrylate monomer or oligomer in an amount sufficient to provide an acrylate-aliphatic polyurethane prepolymer with free isocyanate groups; and c) reacting a pentaerythritol polyacrylate with the free isocyanate groups of the acrylate-aliphatic polyurethane prepolymer in about a stoichiometric amount to provide a multifunctional polyacrylate aliphatic polyurethane oligomer of less than about 5000 molecular weight and having substantially no free reactive isocyanate or hydroxy groups and having CO- and N-polyacrylate groups at the one or other end of the oligomer moiety.

21. The multifunctional polyacrylate polyaliphatic urethane oligomer produced by the method of claim 20.

* * * * *